(12) United States Patent
Naidoo

(10) Patent No.: US 9,085,489 B2
(45) Date of Patent: Jul. 21, 2015

(54) METHOD FOR ATTACHING A PRE-SINTERED BODY OF POLYCRYSTALLINE DIAMOND MATERIAL TO A SUBSTRATE

(71) Applicant: Element Six Abrasives, S.A., Luxembourg (LU)

(72) Inventor: Kaveshini Naidoo, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 14/367,148

(22) PCT Filed: Dec. 13, 2012

(86) PCT No.: PCT/EP2012/075375
§ 371 (c)(1),
(2) Date: Jun. 19, 2014

(87) PCT Pub. No.: WO2013/092370
PCT Pub. Date: Jun. 27, 2013

(65) Prior Publication Data
US 2015/0000201 A1    Jan. 1, 2015

Related U.S. Application Data

(60) Provisional application No. 61/578,414, filed on Dec. 21, 2011.

(30) Foreign Application Priority Data

Dec. 21, 2011  (GB) .................................. 1122010.0

(51) Int. Cl.
| | |
|---|---|
| *B24D 3/02* | (2006.01) |
| *B24D 18/00* | (2006.01) |
| *C04B 37/02* | (2006.01) |
| *E21B 10/46* | (2006.01) |

(52) U.S. Cl.
CPC ............ *C04B 37/026* (2013.01); *C04B 37/023* (2013.01); *C04B 2237/02* (2013.01);
(Continued)

(58) Field of Classification Search
CPC ........... B24D 3/02; B24D 18/00; E21B 10/46
See application file for complete search history.

(56) References Cited

U.S. PATENT DOCUMENTS

| | | | |
|---|---|---|---|
| 4,224,380 A | 9/1980 | Bovenkerk et al. | |
| 5,484,096 A | 1/1996 | Tank | |

(Continued)

FOREIGN PATENT DOCUMENTS

| | | |
|---|---|---|
| EP | 0824605 B | 7/2002 |
| GB | 2465175 A | 5/2010 |

(Continued)

OTHER PUBLICATIONS

International Search Report for PCT/EP2012/075375 dated Jan. 23, 2013.

(Continued)

*Primary Examiner* — Pegah Parvini
(74) *Attorney, Agent, or Firm* — Bryan Cave LLP

(57) ABSTRACT

A method of attaching a pre-sintered body of polycrystalline diamond material to a substrate along an interface therebetween, the substrate being formed of cemented carbide and a metal binder phase dispersed therein, comprises placing a layer comprising one or more elements or alloys thereof on the interface on one or other of the body of polycrystalline diamond material or substrate; the one or more elements being selected to form a eutectic mixture with the metal in the binder phase, the eutectic mixture having a lower melting point than the melting point of the metal in the binder phase of the substrate. The other of the body of polycrystalline diamond material or the substrate is then placed on the layer and the body of polycrystalline material, the layer and the substrate are then subjected to a predetermined temperature at least equal to or greater than the melting point of the eutectic mixture at substantially ambient pressure or a vacuum to melt the metal in the binder phase at the interface with the substrate so that the metal from the binder phase infiltrates into the adjacent body of polycrystalline diamond material to form a bond between the body of polycrystalline diamond material and the substrate.

12 Claims, 1 Drawing Sheet

(52) U.S. Cl.
    CPC ....... *C04B2237/12* (2013.01); *C04B 2237/122* (2013.01); *C04B 2237/124* (2013.01); *C04B 2237/16* (2013.01); *C04B 2237/363* (2013.01); *C04B 2237/401* (2013.01); *C04B 2237/50* (2013.01); *C04B 2237/52* (2013.01); *C04B 2237/592* (2013.01); *C04B 2237/60* (2013.01); *C04B 2237/61* (2013.01); *C04B 2237/706* (2013.01); *C04B 2237/708* (2013.01)

(56) References Cited

U.S. PATENT DOCUMENTS 5,738,698 A    4/1998  Kapoor et al.
2006/0254830 A1    11/2006  Radtke
2006/0266558 A1*   11/2006  Middlemiss et al. ......... 175/426

FOREIGN PATENT DOCUMENTS

| WO | 97/23662 A1 | 7/1997 |
| WO | 99/29465 A1 | 6/1999 |
| WO | 2009/125355 A1 | 10/2009 |
| WO | 2011/012708 A1 | 2/2011 |

OTHER PUBLICATIONS

International Search Report for GB1122010.0 dated Jan. 21, 2012.
International Search Report for GB1222448.1 dated May 23, 2013.

\* cited by examiner

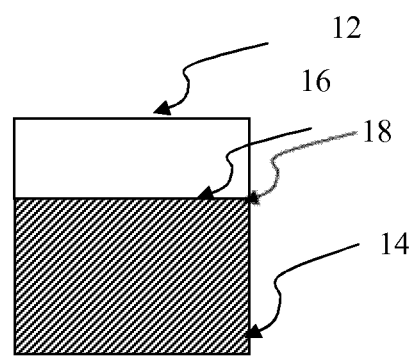

METHOD FOR ATTACHING A PRE-SINTERED BODY OF POLYCRYSTALLINE DIAMOND MATERIAL TO A SUBSTRATE

FIELD

This disclosure relates to a method for attaching a pre-sintered body of polycrystalline diamond material to a substrate to form a polycrystalline diamond compact for use as, for example, a cutting element in applications such as rock drilling and other operations which require the high abrasion resistance or wear resistance of a diamond surface.

BACKGROUND

One type of conventional cutting element used in rotary drilling operations in earth formations comprises an abrasive composite mounted on a substrate. The composite typically comprises a body of sintered polycrystalline diamond material adhered to a cemented carbide substrate, such as cemented tungsten carbide, and containing a metal binder such as cobalt. Cutter inserts for machining and other tools also may comprise a body of polycrystalline diamond (PCD) bonded to a cemented carbide substrate. PCD is an example of a superhard material, also called superabrasive material, which has a hardness value substantially greater than that of cemented tungsten carbide.

Components comprising PCD material are used in a wide variety of tools for cutting, machining, drilling or degrading hard or abrasive materials such as rock, metal, ceramics, composites and wood-containing materials. PCD comprises a mass of substantially inter-grown diamond grains forming a skeletal mass, which defines interstices between the diamond grains. PCD material comprises at least about 80 volume % of diamond and may be made by subjecting an aggregated mass of diamond grains to an ultra-high pressure of greater than about 5 GPa, typically about 5.5 GPa or greater, and a temperature of at least about 1200° C., typically about 1440° C., in the presence of a sintering aid, also referred to as a catalyst material for diamond. A catalyst material for diamond is understood to be material that is capable of promoting direct inter-growth of diamond grains at a pressure and temperature condition at which diamond is thermodynamically more stable than graphite. Some catalyst materials for diamond may promote the conversion of diamond to graphite at ambient pressure, particularly at elevated temperatures. Examples of catalyst materials for diamond are cobalt, iron, nickel and certain alloys including any of these. PCD may be formed on a cobalt-cemented tungsten carbide substrate, which may provide a source of cobalt catalyst material for the PCD, the metal binder/catalyst from the cemented carbide substrate sweeping from the substrate through the diamond grains to promote sintering of the diamond grains. As a result, the diamond grains become bonded to each other to form a polycrystalline diamond layer and the diamond layer becomes bonded to the substrate. The interstices within PCD material may at least partly be filled with the catalyst material.

One of the factors limiting the success of the polycrystalline diamond (PCD) abrasive cutters is the generation of heat due to friction between the PCD and the work material. This heat causes thermal degradation of the diamond layer. Thermal degradation causes damage to the PCD through two mechanisms. Firstly, differential thermal expansion between the binder, which is also known as a solvent-catalyst material, and the bonded diamond crystals can cause the diamond-to-diamond bonding to rupture. Such differential thermal expansion is known to occur at temperatures of more than about 400° C. Secondly, the solvent metal catalyst can cause undesired catalysed phase transformation changing the diamond back to a graphitic or amorphous form limiting the practical use of the PCD material to a temperature of about 750° C.

One known technique to improve the thermal stability of the PCD material involves removing the sintered PCD layer from the substrate, subjecting the PCD layer to a suitable process for removing the solvent-catalyst material, such as acid-leaching, and subsequently re-attaching it to the substrate. The PCD with solvent-catalyst removed has good thermal stability and is commonly referred to as a thermally stable polycrystalline diamond (TSP). This process extends the useful cutting life of a cutting tool incorporating TSP as the cutting element. However, a problem known to exist with such TSP is that it is difficult to achieve a good re-attachment of the TSP to a substrate that can then be fabricated into a tool. The reason for this is that, typically, PCD compacts are brazed into a tool body for use, for example, in a drill bit for drilling in subterranean formations. If a conventional braze is used to attach the TSP to the substrate forming the abrasive compact cutting element, when the abrasive compact is brazed to the tool the heat from the brazing may soften the bond between the TSP and the substrate causing the TSP to become loose and move out of alignment. Furthermore, the process of attaching the TSP to a substrate is typically performed at high pressure and high temperature (HPHT) where diamond is thermodynamically stable and where the temperature is high enough to achieve bonding between the TSP and the substrate. This thereby renders the reattachment process an expensive process.

Other solutions that have been proposed to attach a cemented carbide substrate to a TSP body include to re-infiltrate the TSP body with the cobalt from the substrate or to place an additional layer of cobalt at the interface between the substrate and TSP body and subject it to a thermal cycle. The problem with these methods is that the cobalt requires a high temperature to melt and infiltrate the interstices between the diamond grains forming the TSP body. The temperature required to melt the cobalt is around 1300° C. and, at this temperature at ambient pressure, diamond is unstable in the presence of cobalt. The cobalt causes graphitisation of the TSP body and introduces thermal damage. However, if an HPHT cycle is used to maintain the TSP in the diamond stable region at the high temperatures when bonding the TSP to the substrate, high costs are incurred.

In addition, diamond is very difficult to wet, making the attachment of diamond to a variety of substrates difficult. As TSP compacts are essentially composed only of diamond, they are difficult to bond to cemented tungsten carbide supports, for example.

There is a need to overcome or substantially ameliorate the above-mentioned problems through a bonding technique for bonding a body of PCD material to a substrate.

SUMMARY

Viewed from a first aspect there is provided a method for attaching a presintered body of polycrystalline diamond material to a substrate along an interface therebetween, the substrate being formed of cemented carbide and a metal binder phase dispersed therein, the method comprising:

placing a layer comprising one or more elements or alloys thereof on the interface on one or other of the body of polycrystalline diamond material or substrate; the one or more elements being selected to form a eutectic mixture, the eutectic mixture having a lower melting point than the melting point of the metal in the binder phase of the substrate;

placing the other of the body of polycrystalline diamond material or the substrate on the layer;

subjecting the body of polycrystalline material, the layer comprising one or more elements and the substrate to a predetermined temperature at least equal to or greater than the melting point of the eutectic mixture at substantially ambient pressure or a vacuum to melt the metal in the binder phase at the interface with the substrate so that the metal from the binder phase infiltrates into the adjacent body of polycrystalline diamond material to form a bond between the body of polycrystalline diamond material and the substrate.

In some embodiments, prior to the step of placing a layer comprising one or more elements or alloys thereof on the interface on one or other of the body of polycrystalline diamond material or substrate, the method further comprises removing solvent-catalyst material from interstices of the body of polycrystalline diamond material, for example from the interstices of at least a portion of the body of PCD material.

BRIEF DESCRIPTION OF THE SOLE DRAWING

Embodiments will now be described by way of example only and with reference to the accompanying drawing, FIG. 1, which is a side elevation of a cutting element according to an embodiment.

DETAILED DESCRIPTION OF EMBODIMENTS

As used herein, "polycrystalline diamond" (PCD) material comprises a mass of diamond grains, a substantial portion of which are directly inter-bonded with each other and in which the content of diamond is at least about 80 volume percent of the material. In one embodiment of PCD material, interstices between the diamond grains may at least partly be filled with a binder material.

As used herein, "catalyst material for diamond" is a material that catalyses intergrowth of polycrystalline diamond particles or grains under conditions of temperature and pressure at which diamond is more thermodynamically stable than graphite.

As used herein, "interstices" or "interstitial regions" are regions between the diamond grains of PCD material.

As used herein, a "green body" is an article that is intended to be sintered or which has been partially sintered, but which has not yet been fully sintered to form an end product. It may generally be self-supporting and may have the general form of the intended finished article.

An abrasive composite is formed in the conventional manner by, for example, be made by subjecting an aggregated mass of diamond grains to an ultra-high pressure of greater than about 5 GPa, typically about 5.5 GPa or more, and temperature of at least about 1200° C., typically about 1440° C., in the presence of a sintering aid, also referred to as a catalyst material for diamond. Examples of catalyst materials for diamond are cobalt, iron, nickel and certain alloys including any of these. The PCD may be formed on a cobalt-cemented tungsten carbide substrate, which may provide a source of cobalt catalyst material for the PCD, the metal binder/catalyst from the cemented carbide substrate sweeping from the substrate through the diamond grains to promote sintering of the diamond grains. The diamond grains become bonded to each other to form a body of polycrystalline diamond which becomes bonded to the substrate along an interface. The interstices within body of PCD material may at least partly be filled with the catalyst material.

To increase the thermal stability of the body of PCD material after sintering, the body of PCD material is subjected to a conventional process for removing the solvent-catalyst material from the interstices. Examples of such conventional processes include chemical treatments, for example acid leaching or aqua regia bath, an electrochemical technique such as an electrolytic process, a liquid metal solubility technique, or a liquid metal infiltration technique, or combinations of one or more of these or other known processes. The removal of the catalyst material from the interstices of the at least a portion of the body of PCD material may be to a selected depth from an exterior of the PCD body, or, in some embodiments, the entire PCD body may be subjected to the leaching process causing substantially all of the original catalyst material to be removed from the interstices leaving voids between the diamond grains. As known in the art, at least partial catalyst removal from the PCD may provide a body of PCD material with increased thermal stability and such PCD material is commonly referred to as thermally stable polycrystalline diamond (TSP). This may also beneficially affect the wear resistance of the PCD material in use.

In some embodiments, the solvent-catalyst material may be removed from all or a desired region of the body of PCD material by an acid leaching technique such as that described, for example, in the applicants' co-pending GB patent application published as GB 2465175 or another known technique such as that described, for example in U.S. Pat. No. 4,224,380.

Either prior to the removal of the solvent-catalyst or after subjecting the body of PCD material to the above-described treatment to remove the solvent-catalyst, the body of PCD material is removed from the substrate on which it was formed by, for example, a cutting process. The PCD material then needs to be re-attached to a substrate to form a PCD compact element for use in, for example, a cutting tool.

FIG. 1 shows a cutting element composite 10 comprising a thermally stable body of PCD material 12 (TSP) placed on a cemented carbide substrate 14 prior to re-bonding the body of PCD material 12 to a substrate 14. A small amount of additional material 16 which forms a eutectic mixture is chosen such that the melting point of the eutectic mixture has a lower melting point than that of the metal binder matrix in the substrate 14. The additional material 16 is distributed over the interface 18 between the body of PCD material 12 and the substrate 14. The amount of additional material 16 may be, for example, less than 10 wt % of the leached body of PCD material 12, and, in some embodiments, less than 1 wt %. These quantities are expected to be sufficient to manage the stresses between the TSP body 12 and the substrate 14 thereby increasing the likelihood of a successful bond between the TSP body 12 and the substrate 14.

The composite 10 is subjected to a thermal cycle in a vacuum furnace, or a furnace with an inert atmosphere, to a temperature around the liquidus temperature of the eutectic mixture 16 at the interface 18. The temperature is maintained for a sufficient time to allow bonding of the TSP body 12 and the substrate 14. The material 16 distributed at the interface 18 lowers the melting point of the metal binder matrix in the cemented carbide substrate 14 allowing the bonding to be achieved without the need for a costly High Pressure High Temperature (HPHT) cycle and at a low enough temperature that thermal damage to the TSP body 12 is not significant.

In some embodiments, the metal binder in the cemented carbide substrate 14 is cobalt and examples of materials which may be used as the additional material 16 forming the eutectic mixture for such a binder are shown in Table 1. The eutectic mixture 16 may be formed, for example, of one or more of the following elements, either as individual elements, alloys thereof or combinations of any one or more of these.

TABLE 1

Effect of element addition on Co eutectic liquidus temperature

|  | Wt % | Atom % | Eutectic Temperature (° C.) |
|---|---|---|---|
| Sulphur | 27 | 40 | 877 |
| Zinc | 53 | 50 | 966 |
| Phosphorus | 12 | 20 | 1023 |
| Antimony | 41 | 25 | 1095 |
| Boron | 5-6 | 24 | 1102 |
| Copper | 95 | 95 | 1110 |
| Germanium | 29 | 25 | 1110 |
| Tin | 33 | 20 | 1112 |
| Titanium | 16 | 19 | 1135 |
| Manganese | 63 | 65 | 1160 |
| Silicon | 12 | 23 | 1195 |
| Niobium | 21 | 14.5 | 1235 |
| Vanadium | 38 | 42 | 1240 |
| Tantalum | 31 | 13 | 1276 |

The materials producing the lower eutectic temperatures in the above table are examples only. The dissolved carbon already present in the cobalt matrix from the substrate 14 is expected to lower the melting point further, so that the values listed in Table 1 are for indication purposes only. At these lower temperatures, an HPHT cycle is not required and a thermal cycle of, for example, less than 15 minutes may be used without causing thermal degradation to the TSP body 12.

To ensure bonding but not full infiltration of the leached body of PCD material 12, a small quantity of additional material 16 is used, for example, less than 10 wt % of the leached PCD body 12, and, in some embodiments, less than 1 wt %. These quantities may be sufficient to manage the stresses between the TSP table and the substrate thereby increasing the likelihood of a successful bond between the TSP table and the substrate. The binder may infiltrate deeper than 5 microns, or 50 microns, or 200 microns into the TSP.

The mixture 16 may be placed as a layer on the interface, for example, in the form of a powder, a foil, a coating, a compact or a pre-cast tape which is placed on the interface 18. Furthermore, the layer 18 may be in the form of a continuous layer on the interface, or a discontinuous layer in which the material is placed in discrete areas on the interface 18.

Embodiments are described in more detail with reference to an example which is not intended to be limiting.

EXAMPLE 0.05-0.1 grams of sulphur powder may be distributed evenly on top of a cobalt cemented tungsten carbide substrate of diameter approximately 20 mm, for example by spraying of a slurry or by lightly dusting the substrate surface or by any other suitable means. A PCD layer with substantially all the cobalt removed from the interstices thereof by a suitable method known in the art may be placed on top of the distributed material on the substrate. The TSP, sulphur and substrate stack may be heated in an inert atmosphere (for example argon) at substantially ambient pressure, or a vacuum, to approximately 850° C. or less for a period of 10 minutes or whatever time is sufficient to achieve acceptable bonding. After cooling it is expected that the TSP will be strongly bonded to the substrate, with a region of approximately 50-200 microns in the TSP layer adjacent to the substrate containing a combination of cobalt, tungsten, carbon and sulphur in the pores.

Although particular embodiments have been described and illustrated, it is to be understood that various changes and modifications may be made. For example, the catalyst-binder material described herein has been identified by way of example as being cobalt. It should be understood that other catalyst-binder materials may be used in which case the additional material 16 forming the eutectic mixture will be chosen to be an element or compound which forms a eutectic mixture having a lower melting point than that of the metal in the binder phase of the substrate 14. An example of an alternative catalyst-binder is nickel. In this embodiment, or the embodiment where cobalt forms the catalyst-binder, any material that forms a nitride, boride or carbide with cobalt or nickel from the substrate may be used to form the eutectic mixture 16 having a lower melting point than the melting point of cobalt or nickel.

The invention claimed is:

1. A method for attaching a pre-sintered body of polycrystalline diamond material to a substrate along an interface therebetween, the substrate being formed of cemented carbide and a metal binder phase dispersed therein, the method comprising:
   placing a layer comprising one or more elements or alloys thereof on the interface on one or other of the body of polycrystalline diamond material or substrate; the one or more elements or alloys being selected to form a eutectic mixture with the metal in the binder phase, the eutectic mixture having a lower melting point than the melting point of the metal in the binder phase of the substrate;
   placing the other of the body of polycrystalline diamond material or the substrate on the layer;
   subjecting the body of polycrystalline material, the layer comprising one or more elements or alloys and the substrate to a predetermined temperature at least equal to or greater than the melting point of the eutectic mixture at substantially ambient pressure or a vacuum to melt the metal in the binder phase at the interface with the substrate so that the metal from the binder phase infiltrates into the adjacent body of polycrystalline diamond material to form a bond between the body of polycrystalline diamond material and the substrate.

2. The method of claim 1, wherein the metal binder phase in the cemented carbide substrate comprises cobalt.

3. The method of claim 2, wherein the step of placing the layer comprising one or more elements or alloys thereof on the interface on one or other of the body of polycrystalline diamond material or substrate comprises placing a layer comprising one or more of sulphur, zinc, phosphorus, antimony, boron, copper, germanium, tin, titanium, manganese, silicon, niobium, vanadium, tantalum either as individual elements, combinations of elements or one or more alloys thereof.

4. The method of claim 1, further comprising, prior to the step of placing a layer comprising one or more elements or alloys thereof on the interface on one or other of the body of polycrystalline diamond material or substrate, removing solvent-catalyst material from interstices of the body of polycrystalline diamond material.

5. The method of claim 4, wherein the step of removing the solvent-catalyst material comprises removing the solvent-catalyst material from the interstices of at least a portion of the body of polycrystalline diamond material.

6. The method of claim 5, wherein the step of removing the solvent-catalyst material comprises removing the solvent-catalyst material from the interstices of at least a portion of the body of polycrystalline diamond material to a selected depth from an exterior surface of the body of polycrystalline diamond material, or removing the solvent-catalyst material from substantially all of interstices leaving voids between the diamond grains in the body of polycrystalline diamond material.

7. The method of claim 1, wherein the step of placing a layer comprising one or more elements or alloys thereof on the interface on one or other of the body of polycrystalline diamond material or substrate comprises placing a layer comprising less than 10 wt % of the body of polycrystalline diamond material from which the solvent-catalyst material has been removed from at least a portion of the body of polycrystalline diamond material.

8. The method of claim 1, wherein the step of placing a layer comprising one or more elements or alloys thereof on the interface on one or other of the body of polycrystalline diamond material or substrate comprises placing a layer comprising less than 1 wt % of the body of polycrystalline diamond material from which the solvent-catalyst material has been removed from at least a portion of the body of polycrystalline diamond material.

9. The method of claim 1, wherein the metal binder phase in the cemented carbide substrate comprises cobalt or nickel, and wherein the step of placing the layer comprising one or more elements or alloys thereof on the interface on one or other of the body of polycrystalline diamond material or substrate comprises placing the layer comprising a material that forms a nitride, boride or carbide with cobalt or nickel from the substrate to form the eutectic mixture having a lower melting point than the melting point of the metal in the binder phase, the eutectic mixture comprising the nitride, boride or carbide forming material.

10. The method of claim 1, wherein the step of placing a layer comprising one or more elements or alloys thereof on the interface on one or other of the body of polycrystalline diamond material or substrate comprises placing a layer in the form of a powder, a foil, a coating, a compact or a pre-cast tape.

11. The method of claim 1, wherein the step of placing a layer comprising one or more elements or alloys thereof on the interface on one or other of the body of polycrystalline diamond material or substrate comprises placing a layer in the form of a continuous layer on the interface.

12. The method of claim 1, wherein the step of placing a layer comprising one or more elements or alloys thereof on the interface on one or other of the body of polycrystalline diamond material or substrate comprises placing a discontinuous layer in discrete areas on the interface.

* * * * *